L. O. WALDO.
FISH TRAPPING DEVICE.
APPLICATION FILED FEB. 12, 1912.
1,049,551.
Patented Jan. 7, 1913.
2 SHEETS—SHEET 1.
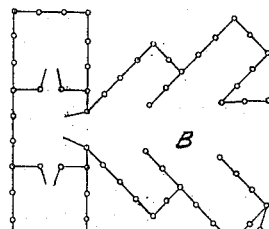
Fig. 1
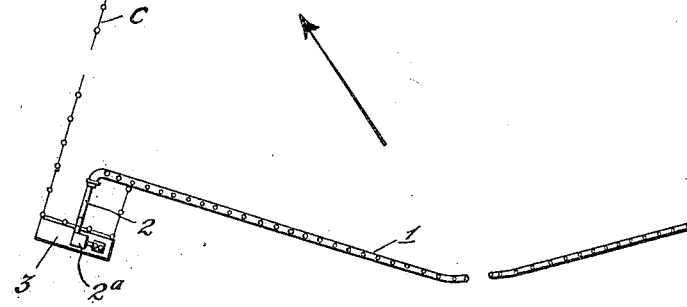
Fig. 2.
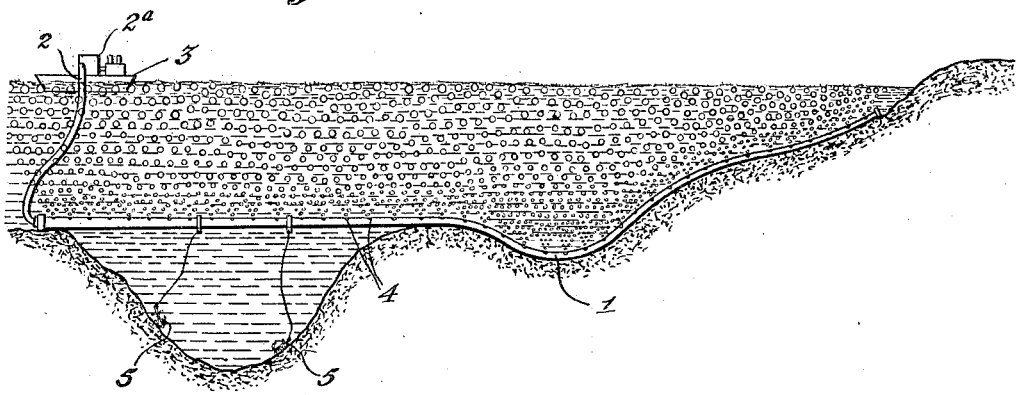
Fig. 3.
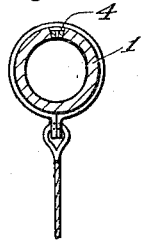
Witnesses
James E. Sproll.
Arlita Adams.
Inventor
Lucius O. Waldo.
By
Adams & Brooks.
Attorneys
COLUMBIA PLANOGRAPH CO., WASHINGTON, D. C.

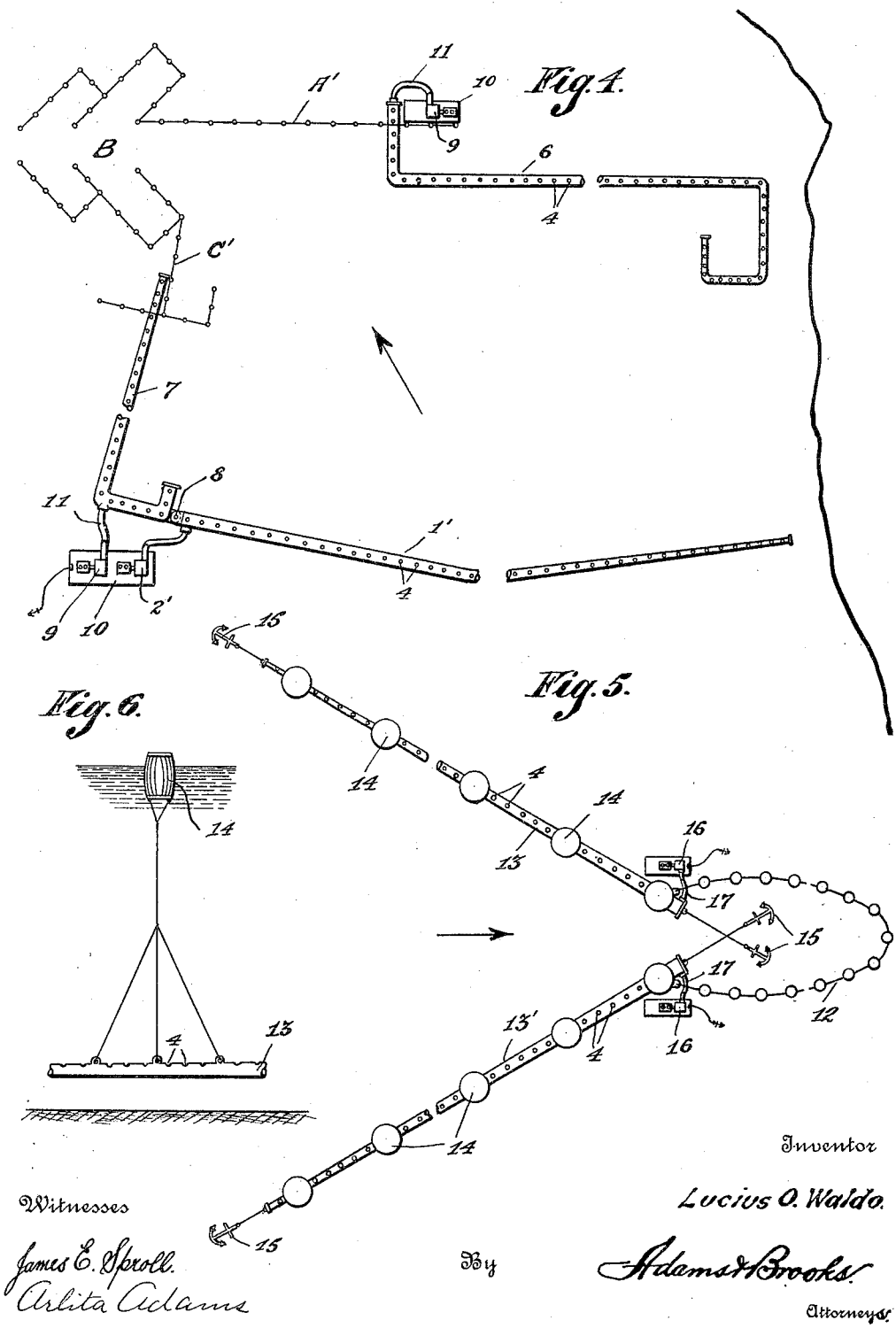

UNITED STATES PATENT OFFICE.

LUCIUS O. WALDO, OF BELLINGHAM, WASHINGTON.

FISH-TRAPPING DEVICE.

1,049,551.  Specification of Letters Patent.  Patented Jan. 7, 1913.

Application filed February 12, 1912. Serial No. 677,258.

*To all whom it may concern:*

Be it known that I, LUCIUS O. WALDO, a citizen of the United States of America, and a resident of the city of Bellingham, in the county of Whatcom and State of Washington, have invented certain new and useful Improvements in Fish-Trapping Devices, of which the following is a specification.

My invention relates to devices of the above type, and has for its primary object to provide a construction through the medium of which a buoyant fluid can be discharged beneath the surface of the water to form a defining barrier or boundary for restraining the fish in their travel.

Other objects will be set forth as my description progresses and those features of construction, arrangements and combinations of parts on which I desire protection, succinctly defined in my annexed claims.

Referring to the accompanying drawings wherein like characters of reference indicate like parts throughout: Figure 1 is a diagrammatical view of my invention applied to a stationary fish trap, of a well known type. Fig. 2 is a vertical section showing a submerged fluid delivery pipe or line, as in operation. Fig. 3 is a section through the delivery pipe. Fig. 4 is a diagrammatical view showing another arrangement of my fluid delivery pipes in connection with a fish trap. Fig. 5 illustrates my invention modified for use in connection with a purse seine, and Fig. 6 is a fragmentary elevation of one of the fluid discharge pipes employed in the construction shown in Fig. 5.

In accordance with my invention I provide a submerged fluid delivery pipe line of the desired length, suitable anchors and floats being provided to hold and maintain the same at a predetermined depth. This line of pipe which can be of any desired construction or material, is provided with a longitudinal series of discharge openings or jets, as 4, arranged in close relation to insure of the bubbles resulting from the discharged buoyant fluid rising in proper relation to form a barrier across which the fish will not travel. The buoyant fluid to be discharged to form this network of bubbles can be air or any other suitable buoyant body.

In Fig. 1, I have shown a fluid delivery pipe, as 1, extending shoreward from the hook of the jigger C and substantially paralleling the lead A of a stationary trap B, of a well known construction wherein piles having suitable mesh hung on them are driven into the water's bed. Pipe 1 which is tapered from its feed end, as shown, to thereby obtain practically a uniform pressure throughout its length is connected by a flexible connection 2 with a suitable pump, as 2ª which is conveniently shown as mounted on a scow 3, anchored in any suitable manner. The invention in this form is intended for restraining such untrapped fish or school of fish as may be in proximity to the trap against traveling away, particularly upon change of tide. Consequently, pump 2 will only be operated periodically or during the period of a contrary tide.

Reference numeral 5 indicates anchors which may be connected with pipe 1, as required.

In Fig. 4 I have shown the trap provided with short mesh leads and jiggers A', C' respectively and fluid delivery pipes 6 and 7 arranged to form continuations thereof. In conjunction with pipe 7, I provide a pipe 1', connected with a pump 2' for operation in like capacity with respect to pipe 1, and further, being preferably hinged, as at 8, whereby it can be adjusted as required. Delivery pipes 6 and 7 are connected with respective pumps, as 9, on scows 10, through the medium of flexible connections 11.

In Figs. 5 and 6 I have illustrated my invention in connection with a floating trap or purse seine, as 12, the same comprising two pipes 13, 13' which are supported by suitable floats 14 and normally anchored converging toward the trap by suitable anchors 15. Reference numeral 16 indicates pumps for supplying fluid under pressure through flexible connections 17 to pipes 13, 13'. In this last named or portable construction, the discharging fluid will form two distinct leads extending to the trap which latter can be removably secured, in any suitable manner, as to the adjacent floats 14, and removed and another substituted, as required.

By my invention I am enabled to operate in waters without obstructing navigation, the invention can be installed in localities where piles cannot be driven, and further when once installed can be readily rearranged or removed.

Having thus described my invention, what I claim as new, and desire to secure by Let- ters Patent of the United States of America, is:—

1. In a fish trapping device, an elongated hollow fluid discharge member formed for discharge of fluid from its side, said member being elongated and normally submerged whereby the buoyant fluid can rise and form a defining barrier or boundary for restraining the fish, and means for supplying buoyant fluid under pressure to said first means.

2. In combination with a fish trapping device, means for effecting the leading of the fish to said trap comprising a fluid discharge means extending therefrom beneath the water, and means for supplying a buoyant fluid under pressure to said fluid discharge means.

3. In combination with a fish trapping device, means for defining a boundary serving to restrain the fish in their travel comprising a normally submerged fluid discharge means extending from said trapping device, and means for supplying a buoyant fluid to said discharge means.

4. In combination with a fish trapping device, means for defining a boundary serving to restrain the fish in their travel comprising a normally submerged fluid discharge means extending from said trapping device, said discharge means being tapered and provided with discharge openings spaced lengthwise thereof, and means connected with the larger end of said fluid discharge means for supplying a buoyant fluid thereto.

Signed at Bellingham, Wash. this 31 day of January 1912.

LUCIUS O. WALDO.

Witnesses:
 HENRY W. PARRON,
 W. J. GRISWOLD.

Copies of this patent may be obtained for five cents each, by addressing the " Commissioner of Patents, Washington, D. C."